July 9, 1946.   C. E. EMMER   2,403,644
MACHINE FOR FORMING PLASTIC BINDERS
Filed Jan. 2, 1943   2 Sheets-Sheet 1
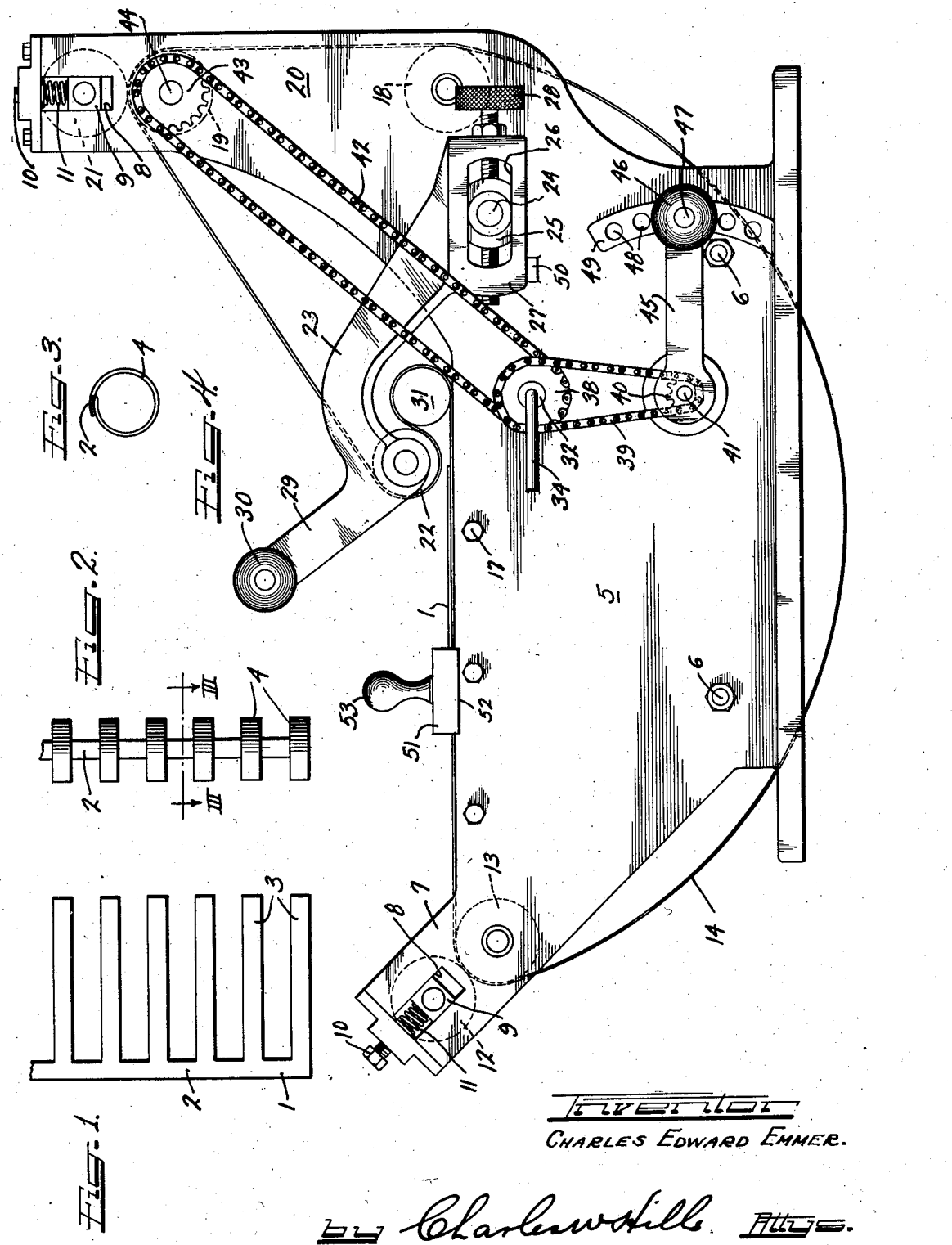
Inventor
CHARLES EDWARD EMMER.
by Charles W. Hill. Attys.

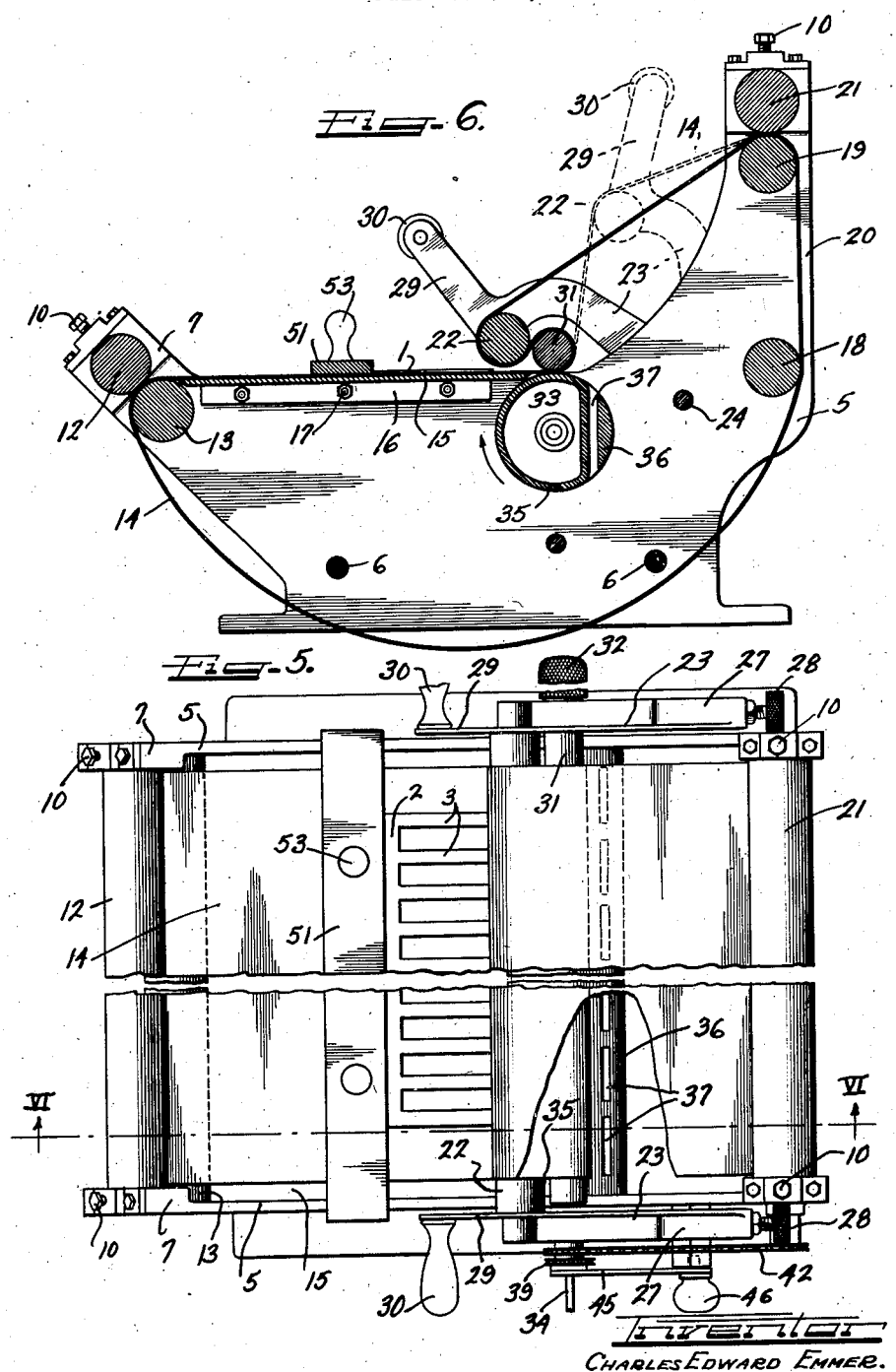

Patented July 9, 1946

2,403,644

UNITED STATES PATENT OFFICE 2,403,644

MACHINE FOR FORMING PLASTIC BINDERS

Charles Edward Emmer, Chicago, Ill., assignor to General Binding Corporation, Chicago, Ill., a corporation of Illinois Application January 2, 1943, Serial No. 471,174

16 Claims. (Cl. 18—19)

This invention relates to an apparatus for more efficiently manufacturing curled articles from synthetic plastic materials.

The present invention, more specifically, pertains to a machine for quickly and efficiently producing a binder or a curled article from thermoplastic material, such as Celluloid, pyroxylin, "Vinylite," "Ethocel" and other modern plastics, and more particularly to such a machine as may be used for forming a comb-shaped or branched blank into a binder or the like, by advancing the blank on a carrier between forming elements one of which is carried on and rotated by the carrier while another coacting element timed to operate with the carrier, subjects the advancing blank to preheated and hot treatments as the blank is curled into a predetermined form.

The thermoplastic material from which selected shaped article forming blanks are stamped or cut, is such that it becomes plastic when heated, to permit the same to be formed into a predetermined shape and permits such shape to be retained when the shaped blank cools and sets.

It is an object of this invention to provide an apparatus for treating and shaping synthetic thermoplastic material into a useful article of a given configuration.

Another object of this invention is to provide an apparatus with an improved combination heated and cooled element for use in the fabrication of plastic articles.

Still another object of the invention is to so interrelate feeding and heating instrumentalities of a machine for fabricating plastic articles from synthetic sheet material, that said instrumentalities will operate in proper timed sequence to effect the desired shaping and forming of the desired articles.

It is a further object of the invention to provide a machine wherein preformed synthetic material blanks are advanced and coiled by a carrier as the blanks are first preheated and are then sectionally subjected to hot and warm treatments by mechanisms timed to coact and operate with the carrier.

Another object of this invention is to provide a machine for curling and forming synthetic articles of different sizes, without requiring any appreciable amount of work other than the substitution of different sized freely replaceable forming elements.

Still another object of the invention is to provide an article making machine wherein a flexible carrier for advancing a blank is operable to cradle and rotate an element for the shaping and forming of the article blank as sections thereof are subjected to heated and cooled instrumentalities.

It is furthermore an object of this invention to provide a manually operable machine for facilitating the carrying out of an improved plastic article producing method in a manner well adapted to meet modern quantity production requirements.

It is an important object of this invention to provide simple and effective means for accurately feeding and preheating preformed selectively shaped synthetic blanks to have advance portions of the blanks subjected to a hot treatment while the trailing portions of the blanks remain only preheated as the treated blanks are being curled and shaped.

Other and further important objects of the invention will be apparent from the disclosures in the specification and the accompanying drawings.

In the drawings:

Figure 1 is a fragmentary plan view of one selected design of a preformed blank of plastic material from which a binder is formed in a forming machine embodying the principles of this invention.

Figure 2 is a fragmentary elevational view of the formed binder resulting from the shaping of the selected design of blank shown in Figure 1.

Figure 3 is a transverse sectional view of the binder taken on line III—III of Figure 2.

Figure 4 is a side elevational view of the binder making machine of this invention with the binder forming arbor cradled in the feed belt in blank receiving position.

Figure 5 is a fragmentary top plan view of the machine.

Figure 6 is a vertical sectional view taken on line VI—VI of Figure 5 showing the retracted normal position of the feed belt and arbor cradling control in dotted lines.

As shown in the drawings:

The machine shown in the drawings is of the hand operated type, but may be mechanically operated if desired. The machine is designed to take a preformed blank, designated as a whole by the reference numeral 1, and made of celluloid or other thermoplastic material and shaped as illustrated in Figure 1, and to form said blank into a substantially tubular or curled shape as shown in Figure 2. The blank 1 is preformed by cutting or stamping the same from a strip of celluloid or other thermoplastic sheet material. The blank 1 is comb-shaped and comprises a back or spine 2 having a plurality of spaced parallel fingers or ribs 3 extending perpendicularly to one longitudinal edge of the back or spine 2. In the completed form of the binder shown in Figure 2, the back extends longitudinally of and overlaps the ends of the fingers 3 which have been curled into rings 4 and which may be substantially circular or have some other special shape.

Referring now to Figures 4 to 6, inclusive, the hand operated machine for making the binders comprises a pair of spaced side frames 5 which are joined together by suitable tie-bolts 6. The side frames 5 are adapted to be mounted on a suitable support or base having a trough for receiving the belly or sagging bottom portion of a belt hereinafter referred to. The front ends of the side frames 5 are provided with integral inclined arms or brackets 7 provided with guide slots 8 in each of which a slidable bearing block 9 is engaged. An adjusting screw 10 is threaded through an end member of a frame arm 7 and has threaded engagement with the bearing block 9. A control spring 11 is engaged around each of the adjusting screws 10 within the slots 8 as shown in Figure 4.

Disposed between the frame arms 7 is a pressure roller 12 having supporting stems which are journaled in the slide blocks 9. Coacting with the pressure roller 12 is a belt or apron guide roller 13 over which a blank carrying and feed belt or apron 14 is engaged. The belt or apron 14 is formed of cloth or other suitable material and is of endless construction as clearly illustrated in Figure 4. The belt is positioned between the machine side frames 5 over the guide roller 13 and passes forwardly into the machine over a supporting table or top 15 having side flanges 16 which project downwardly on the inner sides of the upper margins of the side frames 5 and are secured thereto by bolts 17. The top surface of the table is thus positioned flush with the upper edges of the side frames 5, thereby permitting the continuous belt to ride over the table in a plane above the top edges of the side frames. The belt or apron 14 extends downwardly over the guide roller 13 and hangs or sags between the side frames 5 with the lower belly portion of the belt projecting down into the trough provided in the support on which the side frames are mounted. At the rear portion of the machine the endless belt or apron extends upwardly to pass around one side of a guide roller 18 the reduced ends of which are journaled in suitable bearing openings provided in the side frames 5. The endless belt 14 continues upwardly at the rear end of the machine and passes over a driving roller 19 the reduced ends of which are journaled in suitable journal openings provided in upwardly extending rear arms or brackets 20 which are integrally formed on the upper rear portions of the side frames 5. Also rotatably mounted between the upper ends of the frame arms or brackets 20 above the driving roller 19 is a pressure roller 21 the reduced ends of which are mounted in slidable bearing blocks forming part of roller adjusting means similar to the roller adjusting means described in connection with the pressure roller 12. The continuous belt or apron 14 passes over the driving roller and beneath the pressure roller 21 and then passes downwardly to engage around a belt control roller 22.

The reduced supporting ends of the control roller 22 are rotatably journaled in a pair of levers 23 which are journaled on stud 24. The stud 24 for each of the levers 23 is rotatably supported in a side frame 5 and projects into a journal block 25 (Fig. 4) which is slidably disposed in a guide slot 26 formed in a supporting head 27 which is integrally formed at the supported end of a lever 23. Each lever adjusting screw 28 is adjustably threaded through the lever supporting head 27 and through the journal block 25 as well as diametrically through the lever supporting stud 24. This arrangement permits the levers 23 to be adjusted for varying the effective lengths of the swinging levers 23, thereby affording an arrangement for the accommodation of different sized binder forming arbors. Each of the control levers 23 is provided with an extension arm 29 which carries a handle 30.

Seated transversely upon the horizontal portion of the endless belt or apron 14 near the inner end of the supporting table 15 is a free or floating cylindrical forming arbor 31 the ends of which project beyond the sides of the belt or apron 14. One end of the forming arbor 31 is provided with a knurled head or handle 32 permitting convenient removal of the arbor 31 from the belt after a binder forming operation of the machine to permit removal of a curled article from the arbor.

In the normal or released position of the control levers 23, as indicated in dotted lines in Figure 6, the endless belt 14 extends downwardly from the raised position of the control roller 22 and passes underneath the forming arbor 31 and then extends horizontally over the supporting table 15. To normally position the binder forming arbor 31 ready for a binder forming operation, the control levers 23 are adapted to be manually swung downwardly from the dotted line position of Figure 6 into the full line position, thereby causing a portion of the belt to loop around the major portion of the forming arbor to form a retaining pocket or cradle for the arbor.

In the cradled position of the arbor 31 as indicated in full lines in Figure 6, the arbor is swung into pressing relationship with the control roller 22 and is also positioned directly above a combination heated and cooled blank treating element or mandrel which is of cylindrical form and of a diameter materially larger than the diameter of the arbor 31 with which the cylindrical mandrel is positioned to coact. The combination heated and cooled element or mandrel is positioned transversely between the machine side frames 5 and is provided with axial shaft portions which are journaled in suitable bearing openings provided in the machine side frames. One of the mandrel shaft portions is indicated by the reference numeral 32 and is provided with an axial passage leading into an inner heating chamber 33 to permit steam or any other suitable heating medium to enter the chamber 33 from a supply tube or pipe 34 which has one end connected to a heating source and the other end projecting into the mandrel shaft 32.

The improved combination hot and cold mandrel consists of a heating segment 35 containing the heating chamber 33 and a smaller air-cooled or unheated segment 36. The segment 36 is preferably formed of steel and is in the shape of a cylindrical segment and is provided with a plurality of parallel ventilating or cooling passages or slots 37. The segment 36 may become slightly preheated by the heat from the hot segment 35 but the effect of the air passages 37 tends to reduce the temperature of the segment 36 so that the same may serve as a means for cooling or maintaining the trailing portion of a blank at its preheated temperature during an article forming operation. The major portion of the hot and cold cylinder or mandrel is preferably constructed of brass or copper and comprises the cylindrical segment 35 which includes the heating chamber 33 and is rigidly or integrally joined with the minor cylindrical segment 36 to form a cylindrical element.

The combination heated and air-cooled sectional element or mandrel is positioned to permit the apron or belt 14 to pass over the cylindrical surface thereof between the mandrel and the forming arbor when the mandrel is rotated to cause proper conditioning of a binder forming blank during the shaping of the same.

For the purpose of causing rotation of the heated and air-cooled combination mandrel, the shaft portion 32 has a sprocket 38 secured thereon. Engaged over the sprocket 38 is a driving chain 39 which extends downwardly and is engaged around a small driving sprocket 40 which is keyed or otherwise secured on a rotatable stub shaft 41 which is journaled in a suitable bearing provided in one of the side frames 5. Also secured on the mandrel shaft 32 to the inside of the sprocket 38 is an inner sprocket of the same size as the sprocket 38 and around which a drive transmitting chain 42 is engaged. The chain 42 extends diagonally upwardly and engages around an upper sprocket 43 which is secured on the shaft section 44 of the driving roller 19.

For the purpose of operating the driving chains 39 and 42 to transmit a drive to the hot and cold mandrel and to the driving roller 19, a crank handle 45 is secured on the stub shaft 41. The crank handle 45 is provided with a spring controlled knob or head 46 and includes a shiftable pin or stem 47 the inner end of which is positioned to be removably engaged to project into any selected one of a plurality of receiving apertures 48 provided in an arc-shaped bar 49 which is secured on the outer face of the lower corner portion of the machine side frame 5 on which the sprocket supporting stub shaft 41 is mounted, as clearly illustrated in Figure 4.

The apertured segment shaped bar 49 is provided for the purpose of normally setting the position of the heated and air-cooled mandrel to have the heated and cooled segments of the mandrel properly positioned to coact with different portions of blanks while being formed and for positioning the mandrel when different sized forming arbors are used in the machine for the purpose of producing binders of different sizes. When a different sized binder is to be produced the control levers 23 have the pivotal supporting points thereof adjusted by means of the adjusting screws 28 for varying the effective lengths of said levers for the accommodation of a selected size of forming arbor 31.

In the operation of the machine, the forming arbor 31 rests transversely on the belt 14 above the combination heated and air-cooled mandrel, the heated and cooled segments of which are positioned as illustrated in Figure 6 for a particular size of arbor. Said mandrel is held in such position by the crank arm 45 which has the crank arm control pin or stem 47 engaged in a selected one of the openings 48 of the bar 49. For the purpose of holding the forming arbor in position above the sectional heated and cooled mandrel, for a binder forming operation, the control levers 23 are manually swung from the dotted line position of Figure 6 into the full line position of Figure 6, thereby causing the belt control roller 22 to move into its lowermost position, which is determined by means of stop fingers or lugs 50 which are integrally formed on the outer side surfaces of the side frames 5 as shown in Figure 4. When the control levers 23 are swung into the lower positions the belt 14 is caused to loop around the forming arbor 31 to form a pocket or cradle for the arbor and to properly tension the section of the endless belt or apron around said arbor and move the arbor 31 into pressing relationship with the roller 22, ready for a binder forming operation.

To form a tubular type of plastic binder from one of the thermoplastic forms or blanks 1, a blank is laid upon the top horizontal portion of the belt 14 above the table 15 in a transverse position as illustrated in Figure 5, with the fingers or ribs 3 of the blank projecting toward the forming arbor 31 and with the back or spine 2 of the blank disposed transversely of the belt with the free longitudinal edge of the blank back or spine 2 in contact with the front edge of a blank positioning follower or stop-bar 51. The follower 51 is seated upon the top surface of the horizontal section of the apron 14 and is provided with downwardly projecting end flanges 52 which project downwardly to the outside of the upper marginal side surfaces of the two machine side frames 5 to serve as guides when the blank positioning follower or stop-bar 51 is moved forwardly or rearwardly on the machine by means of a pair of knobs or handles 53 or when the follower is carried along by the advancing belt to serve as a stop for a blank as it is advanced toward the arbor 31.

With a plastic blank 1 positioned upon the top of the feed apron 14 above the table 15, in the position illustrated in Figure 4, the operator of the machine manually engages the handles 53 of the blank positioning bar 51 and pushes the bar forwardly over the machine, thereby pushing the blank and moving the front or outer ends of the blank fingers or ribs 3 below the belt control roller 22 into the position shown in full lines in Figure 4. The advance of the blank by the operation of the crank arm 45 then moves the ends of the blank fingers 3 into engagement with the lower portion of the forming arbor 31 and above the cylindrical segment 35 of the mandrel. The blank as it is advanced into forming position becomes slightly preheated and is thus conditioned and positioned ready to have the blank fingers or ribs 3 heated to a desired temperature in order to make the fingers or ribs plastic to facilitate curling and forming. For the purpose of curling the blank the crank arm knob 46 is pulled outwardly to release the stem 47 from a selected aperture of the bar 49, thereby permitting the crank arm 45 to be manually rotated a number of revolutions, determined by the ratio of the sizes of the driving sprocket 40 with respect to the driven sprocket 38. The rotation of the driving sprocket 40 operates the chain 39 and thereby rotates the sprocket 38 on the mandrel shaft, so that the hot segment 35 of the mandrel is brought into contact with the lower surface of the horizontal portion of the belt 14 directly below the fingers or ribs 3 of the blank to further heat the same as they are advanced into the field of operation of the forming arbor 31, which is caused to rotate by the movement of the belt which is operated by means of the driving roller 19 and receives its drive from the chain 42 which is simultaneously operated with the chain 9, due to the operation of the crank handle 45.

As the forming arbor 31 is rotated and pressed toward the roller 22 by the looped portion of the belt as the belt is advanced the heated blank fingers or ribs are softened and caused to curl around the forming arbor between the arbor and the belt to form the binder rings 4. As the heated fingers of the blank are being formed into the binder rings 4, the back or spine 2 of the blank is advanced by the belt into the field of operation of the air-cooled segment 36 of the mandrel which at this stage of the operation is rotated into position to engage beneath the apron and below the blank back or spine 2 to allow that portion of the blank to remain only at its preheated temperature as it passes between the forming arbor and the mandrel to be slightly curled and positioned to overlap the ends of the binder rings 4 to complete the curling or forming of the blank to produce a plastic binder.

During the forming of a binder the forming arbor 31, due to the weight of the belt control roller 22 and the levers 23, causes tensioning of the belt around the arbor so that the arbor exerts a downward pressure toward the heated and air-cooled mandrel to cause pressing of the blank between the pressure mandrel and the forming arbor as the blank is being formed.

By the time the fingers of the blank are curled around the forming arbor and the back or spine portion 2 of the blank has been subjected to the effects of the air-cooled segment 36 of the mandrel, the binder rings 4 cool sufficiently to set and lose their plasticity but retain their curled flexible shape necessary to form flexible rings for the finished binder.

When the binder is completely formed the machine is stopped with the back or spine portion 2 thereof being positioned to rest above the air-cooled mandrel segment 36, so as to avoid deformation or over heating of the formed binder element, that would be caused if the formed element came to rest on the heated segment 35 of the mandrel.

To remove the binder carrying arbor from the machine it is only necessary to manually swing the control levers 23, by means of the handles 30, from the full line position of Figure 6 back into the normal dotted line position, thereby causing the loop portion of the apron to be unwrapped from the arbor to release the same. The released arbor 31 may now be removed from the machine by means of the knurled handle 32, and the completed cooled binder formed on the arbor may be slidably ejected therefrom. By replacing the arbor upon the belt in the position shown in Figure 4 the binder forming operation of the machine may be conveniently and rapidly reheated for the forming of subsequent binders in rapid succession.

While only one size of forming arbor has been shown in the drawings, provision has been made for replacing this mandrel with other mandrels of different diameters in order that binders of different sizes may be made. When arbors of different sizes are substituted, the selected sized roller or mandrel may have the heated and air-cooled segments thereof properly positioned with respect to the arbor 31 by proper operation of the crank arm 45 with respect to the apertured segment-shaped bar 49, for causing proper positioning and coaction with the binder blanks being fed into the machine.

While a round forming arbor of a selected size and cross section has been illustrated and described for use in connection with the improved binder forming machine, herein disclosed, it will of course be understood that forming arbors of different sizes and shapes may be used to provide binders of desired shapes and sizes.

It will of course be understood that various details of construction may be varied through a wide range without departing from the principles of this invention, and it is, therefore, not the purpose to limit the patent granted hereon, otherwise than necessitated by the scope of the appended claims.

I claim as my invention:

1. In an apparatus for forming coiled plastic articles, which apparatus includes a support for a plastic element to be coiled, a rotatable heated and air vented presser element below the support, and operating means for the support and said element for moving the support relative to the rotatable presser element, to move the plastic element over said heated and air vented presser.

2. In an apparatus for forming coiled plastic binders, which apparatus includes a movable endless support for a plastic element to be coiled, a rotatable combination heated and air cooled element below the support, a former carried by the support, and means for operating the heated and air cooled element and said support to cause operation of the former by the support and movement of the plastic element over the rotatable heated and air cooled element and around the former to coil the plastic element into a binder.

3. In an apparatus for forming coiled plastic articles, which apparatus includes a movable endless support for carrying a plastic element to be coiled, a heated segmental element having cooling vents in one segment thereof, said segmental element disposed below the support, a forming means resting on the support, a pivoted control means operable for cradling the forming means in the support, and means for rotating the heated element and moving said support to advance the plastic element for compression between the forming means and the heated element and also cause rotation of the forming means by the support to coil the heated plastic element around the forming means to form a plastic article.

4. In a machine for forming coiled plastic binders, said machine including a support for supporting and advancing a plastic element to be coiled, a forming means on said support, a combination heated and cooled presser element below the support, and means for moving and wrapping the support on the forming means to advance the plastic element for compression between the forming means and the heated and cooled presser element and to coil the plastic element into a binder as the heating and cooling treatments are applied thereto.

5. A plastic binder forming machine comprising a framework, a table supported thereon, a movable support on said table for carrying a blank to be coiled, a heated and cooled segmental element rotatably supported on the framework, a forming arbor on the movable support positioned to coact with said element, and means for rotating the element and moving the movable support to advance the blank over the element to subject the same to heat treatments and coil the treated blank around the forming arbor.

6. A plastic binder forming machine comprising a framework, a table supported thereon, a traveling support on said table for carrying a blank to be coiled, a combination heated and cooled segmental element rotatably supported on the framework in contact with the support, a forming arbor removably supported on the movable support and positioned to coact with the heated and cooled segments of said element, means for looping the movable support around the forming arbor, and driving mechanism for rotating the element and for operating the movable support to advance the blank in timed relationship over the heated and cooled segments of the element and coil the treated blank around the forming arbor to produce a binder.

7. A plastic binder forming machine comprising a framework, a table supported thereon, a movable endless flexible support on said table for carrying a blank to be coiled, a combination heated and cooled segmental element rotatably supported on the framework, a forming arbor carried by the flexible support above said element, adjustable control means pivotally mounted on the framework and engaging the movable support and operable to loop a portion of the movable support around the forming arbor, and driving means for rotating the heated and cooled segments of the element and for operating the movable support to advance the blank over the heated and cooled segments of the element and coil the blank around the forming arbor to form a binder which is removable from the forming arbor when the adjustable control means is operated to unloop the belt to release the forming arbor.

8. A plastic binder forming machine comprising a framework, a table supported thereon, a movable flexible support on said table for carrying a blank to be coiled, a blank preheating pressure element rotatably mounted on the framework and including heated and cooled segments, a forming arbor removably supported on the flexible support above the pressure element, a control means pivoted on the framework engaging the flexible support and movable about a stationary pivot into a position to loop a portion of the flexible support around the forming arbor, and a driving means for operating the rotatable pressure element and for driving the flexible support to advance a preheated blank over the pressure element to additionally heat a portion of the blank while retaining the remaining portion of the blank at its preheated temperature and then coil the entire blank around the forming arbor to produce a binder which is removable from the forming arbor when the forming arbor is released by the operation of the pivotal control.

9. A plastic binder forming machine comprising a framework, a table supported thereon, a movable flexible endless support mounted to travel over said table for carrying a blank to be coiled, a follower resting on the movable support above the table to provide a backstop for properly positioning the blank on the movable support, a blank preheating presser element rotatably supported on the framework and including heated and cooled segments adapted to be consecutively brought into engagement with the movable support, a forming arbor removably resting on the movable support above the pressure element, a pivoted control on the framework and engaging the flexible support adapted to be swung toward the table to cause a portion of the flexible support to be looped around the forming arbor, and means for rotating the pressure element and for operating the flexible support to advance the preheated blank over the pressure element and to subject one portion of the blank to the heated segment to further heat the same and then subject another portion of the blank to the cooled segment of the pressure element and curl the treated blank around the forming arbor to produce a binder which is removable from the forming arbor when the control means is swung away from the table to cause the flexible support to release the forming arbor.

10. A plastic binder forming machine comprising a framework, a table supported thereon, a movable flexible endless support, means on the framework for supporting the flexible support with a portion thereof passing over the table, a follower supported on the flexible support above the table for properly positioning a plastic blank on the flexible support, a sectional heated and cooled pressure element rotatably supported on the framework and coacting with the flexible support, a forming arbor free to roll on the flexible support above the pressure element, a control element pivotally mounted on the framework and engaging the flexible support and operable to cradle the forming arbor in a portion of the flexible support and hold the same above the pressure element, means for adjusting the control element to permit forming arbors of different sizes to be used in the machine, and a driving mechanism on the framework for rotating the pressure element and for operating the endless flexible support to advance the plastic blank and move the same over the heated and cooled sections of the pressure element and coil the blank around the forming mandrel to produce a binder which is releasable from the forming arbor when the control element is swung into release position to free the forming arbor.

11. A plastic binder forming machine comprising a framework, a table supported thereon, a movable flexible endless support, means on the framework for supporting the flexible support with a portion thereof passing over the table, a follower supported on the flexible support above the table for properly positioning a plastic blank on the flexible support, a sectional heated and cooled pressure element rotatably supported on the framework and coacting with the flexible support, a forming arbor free to roll on the flexible support above the pressure element, a control element pivotally mounted on the framework and engaging the flexible support and operable to cradle the forming arbor in a portion of the flexible support and hold the same above the pressure element, means for adjusting the control element to permit forming arbors of different sizes to be used in the machine, a driving mechanism on the framework for rotating the pressure element and for operating the endless flexible support to advance the plastic blank and move the same over the heated and cooled sections of the pressure element and coil the blank around the forming mandrel to produce a binder which is releasable from the forming arbor when the control element is swung into release position to free the forming arbor, and means associated with the driving mechanism for setting the pressure element to properly position the heated and cooled sections thereof with respect to the blank being advanced when arbors of different sizes are used.

12. In a machine for forming coiled plastic binders from plastic blanks, said machine including a rotatable pressure element having a heated chamber and air cooling passages therein, a flexible support driven thereby for carrying a plastic blank over the pressure element to cause heating and cooling of different parts of the blank, a forming arbor removably supported on the flexible support above the pressure element to coil the blank, and a pivotally mounted control means engaging the flexible support for looping and unlooping a portion of the flexible support with respect to the forming arbor to permit curling of the blank around the forming arbor when the flexible support is looped around the forming arbor and to permit removal of the coiled blank from the forming arbor when the flexible support is unlooped to release the forming arbor.

13. In a machine for forming coiled plastic binders, a cylindrical pressure element comprising a large segment and a smaller air passaged segment, and means for heating the larger of said segments.

14. In a machine for forming a tubular binder from a plastic blank, a cylindrical pressure element comprising a chambered major segment and a solid minor segment having cooling slots therein.

15. In a machine for shaping an article out of material requiring the use of heat for treating the same, a cylindrical pressure element comprising a chambered major segment and a minor passaged segment, and means for heating the chambered major segment from within.

16. In a machine for shaping an article out of material requiring the application of heat for treating the same, an axially rotatable cylindrical pressure element made up of segments, means for heating one of said segments, means for cooling another of said segments, and means for rotating the pressure element to alternately bring the segments into coacting relationship with the material as the article is being formed.

CHARLES EDWARD EMMER.